United States Patent
Nayak

(10) Patent No.: US 12,332,062 B2
(45) Date of Patent: Jun. 17, 2025

(54) APPARATUS AND METHODS PROVIDING A MAP LAYER NOISE LEVELS

(71) Applicant: HERE GLOBAL B.V., Eindhoven (NL)

(72) Inventor: Amarnath Nayak, Borivali East (IN)

(73) Assignee: HERE GLOBAL B. V., Eindhoven (NL)

( * ) Notice: Subject to any disclaimer, the term of this patent is extended or adjusted under 35 U.S.C. 154(b) by 253 days.

(21) Appl. No.: 18/089,909

(22) Filed: Dec. 28, 2022

(65) Prior Publication Data
US 2024/0219185 A1   Jul. 4, 2024

(51) Int. Cl.
*G01C 21/34*   (2006.01)
*G06T 7/60*    (2017.01)
*G06V 10/70*   (2022.01)

(52) U.S. Cl.
CPC .......... *G01C 21/3407* (2013.01); *G06T 7/60* (2013.01); *G06V 10/70* (2022.01); *G06T 2207/20081* (2013.01); *G06T 2207/30236* (2013.01); *G06T 2207/30242* (2013.01)

(58) Field of Classification Search
CPC .......... G01C 21/3407; G06T 7/60; G06T 2207/20081; G06T 2207/30236; G06T 2207/30242; G06V 10/70
See application file for complete search history.

(56) References Cited

U.S. PATENT DOCUMENTS

| | | |
|---|---|---|
| 11,360,459 B2 | 6/2022 | Cella et al. |
| 11,900,818 B2* | 2/2024 | Rostamzadeh .......... G06N 7/01 |
| 2002/0181721 A1* | 12/2002 | Sugiyama ................. G01S 5/22 |
| | | 381/92 |

(Continued)

FOREIGN PATENT DOCUMENTS

| | | |
|---|---|---|
| CN | 107851193 A | 3/2018 |
| CN | 108472517 A | 8/2018 |

(Continued)

OTHER PUBLICATIONS

Mark, et. al., "Detection of Anomalous Pollution Sensors Using Deep Learning Strategies," Andres Bello University, SBE: Urban Planning, Global Problems, Local Policies; IOP Conf. Series: Earth and Environmental Science 503 (2020) 012032; doi:10.1088/1755-1315/503/1/012032.

*Primary Examiner* — Tarek Elarabi
(74) *Attorney, Agent, or Firm* — Peter H. Yu; HERE GLOBAL B. V.

(57) ABSTRACT

An apparatus, method and computer program product are provided for providing a map layer of noise levels. In one example, the apparatus receives input data including an image and location data indicating an area in which the image was captured. The apparatus causes a machine learning model to generate a datapoint in a map layer as a function of the input data. The datapoint indicate a predicted decibel level at the area during an instance in which the image was captured. The machine learning model is trained to generate the datapoint as a function of the input data based on training data, where the training data include images and audio data indicating decibel levels of areas in which the images were captured during instances in which the images were captured.

15 Claims, 9 Drawing Sheets

(56) References Cited

U.S. PATENT DOCUMENTS

| | | | | |
|---|---|---|---|---|
| 2015/0110276 A1* | 4/2015 | Gereb | ............... | H04R 29/008 |
| | | | | 381/56 |
| 2020/0388166 A1* | 12/2020 | Rostamzadeh | ...... | G08G 5/0034 |
| 2022/0182495 A1 | 6/2022 | Kwok et al. | | |
| 2024/0233556 A1* | 7/2024 | Rostamzadeh | ........ | G06N 20/10 |

FOREIGN PATENT DOCUMENTS

| | | |
|---|---|---|
| CN | 112085241 A | 12/2020 |
| EP | 3759700 A1 | 9/2019 |

* cited by examiner

APPARATUS AND METHODS PROVIDING A MAP LAYER NOISE LEVELS

TECHNICAL FIELD

The present disclosure generally relates to the field of mapping, associated methods and apparatus, and in particular, concerns, for example, an apparatus configured to providing a map layer of noise levels within areas based on images captured within the areas.

BACKGROUND

Excessive noise levels can degrade the quality of travel for pedestrians and occupants of vehicles. Additionally, certain vehicles may utilize sound-based navigation systems to traverse areas in which conventional navigation systems are unreliable, and ambient noise can adversely affect sound signatures output by the sound-based navigation systems, thereby degrading the utility of the systems. Therefore, there is a need in the art for mapping noise levels and providing a map layer of noise levels for various navigational purposes.

The listing or discussion of a prior-published document or any background in this specification should not necessarily be taken as an acknowledgement that the document or background is part of the state of the art or is common general knowledge.

BRIEF SUMMARY

According to a first aspect, an apparatus comprising at least one processor and at least one non-transitory memory including computer program code instructions is described. The computer program code instructions, when executed, cause the apparatus to: receive training data including images and audio data indicating decibel levels of areas in which the images were captured during instances in which the images were captured; and using the training data, train a machine learning model to generate a datapoint in a map layer as a function of input data, wherein the input data include an image and location data indicating an area in which the image was captured, and wherein the datapoint indicates a predicted decibel level at the area during an instance in which the image was captured.

In various embodiments, the images and audio data are acquired by vehicles, stationary roadside sensors, or a combination thereof, and each of the vehicles and the stationary roadside sensors includes one or more image and sound recording sensors.

In various embodiments, the training data further indicate widths of road links within the areas, and the input data indicate a width of one or more road links within the area.

In various embodiments, the training data further indicate a number of vehicles within the areas during the instances, and the input data indicate a number of vehicles within the area during the instance.

In various embodiments, the training data further indicate historical traffic congestion levels within the areas during the instances, and the input data indicate a historical traffic congestion level within the area during the instance.

In various embodiments, the training data further indicate epochs of the instances, and the input data further indicate an epoch of the instance.

In various embodiments, the training data further indicate types of points-of-interests (POIs) within the areas, and the input data indicate one or more types of POIs within the area.

According to a second aspect, a non-transitory computer-readable storage medium having computer program code instructions stored therein is described. the computer program code instructions, when executed by at least one processor, cause the at least one processor to: receive input data including an image and location data indicating an area in which the image was captured; and cause a machine learning model to generate a datapoint in a map layer as a function of the input data, wherein the datapoint indicates a predicted decibel level at the area during an instance in which the image was captured, wherein the machine learning model is trained to generate the datapoint as a function of the input data based on training data, and wherein the training data include images and audio data indicating decibel levels of areas in which the images were captured during instances in which the images were captured.

In various embodiments, the computer program code instructions, when executed by the at least one processor, cause the at least one processor to cause a notification indicating the map layer on a user interface.

In various embodiments, the computer program code instructions, when executed by the at least one processor, cause the at least one processor to: generate a route based on the datapoint; and cause a notification indicating the route on a user interface.

According to a third aspect, a method of providing a map layer of noise levels, the method comprising: receiving input data including a target image and location data indicating a location in which the target image was captured; causing a machine learning model to generate a datapoint in the map layer as a function of the input data, wherein the datapoint indicates a predicted decibel level at the location during an instance in which the target image was captured, wherein the machine learning model is trained to generate the datapoint as a function of the input data based on training data, and wherein the training data include images and audio data indicating decibel levels of instances in which the images were captured; and causing a notification indicating the map layer on a user interface.

Also, a computer program product may be provided. For example, a computer program product comprising instructions which, when the program is executed by a computer, cause the computer to carry out the steps described herein.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

The steps of any method disclosed herein do not have to be performed in the exact order disclosed, unless explicitly stated or understood by the skilled person.

Corresponding computer programs (which may or may not be recorded on a carrier) for implementing one or more of the methods disclosed herein are also within the present disclosure and encompassed by one or more of the described example embodiments.

The present disclosure includes one or more corresponding aspects, example embodiments or features in isolation or in various combinations whether or not specifically stated (including claimed) in that combination or in isolation. Corresponding means for performing one or more of the discussed functions are also within the present disclosure.

BRIEF DESCRIPTION OF THE DRAWINGS

The embodiments of the invention are illustrated by way of example, and not by way of limitation, in the figures of the accompanying drawings.

DETAILED DESCRIPTION

As discussed above, noise may impact the quality of travel for occupants of vehicles and sound-based navigation systems. To improve the quality of travel and the utility of the sound-based navigation systems, a mapping content provider may establish a map layer of noise levels by acquiring sensor data from vehicles equipped with sound recording sensors, use the sensor data to generate datapoints within the map layer to indicate noise levels of areas in which the sensor data were acquired, and provide routes based on the map layer. However, majority of vehicles within road networks are not equipped with sound recording sensors for determining noise levels of environments in which the vehicles are in. As such, datapoints within the map layer are limited and cannot be readily relied upon.

Embodiments described herein provide a system that receives training data including images and audio data indicating decibel levels of areas in which the images were captured during instances in which the images were captured and uses the training data to train a machine learning model to generate a datapoint in a map layer as a function of input data. The input data include an image and location data indicating an area in which the image was captured, and the datapoint indicate a predicted decibel level at the area during an instance in which the image was captured. Once the machine learning model is trained, the model provides the datapoint as a function of input data without requiring additional sensor data indicating a decibel level at the area during the instance. Details of such system will be further described herein.

Figure 1:
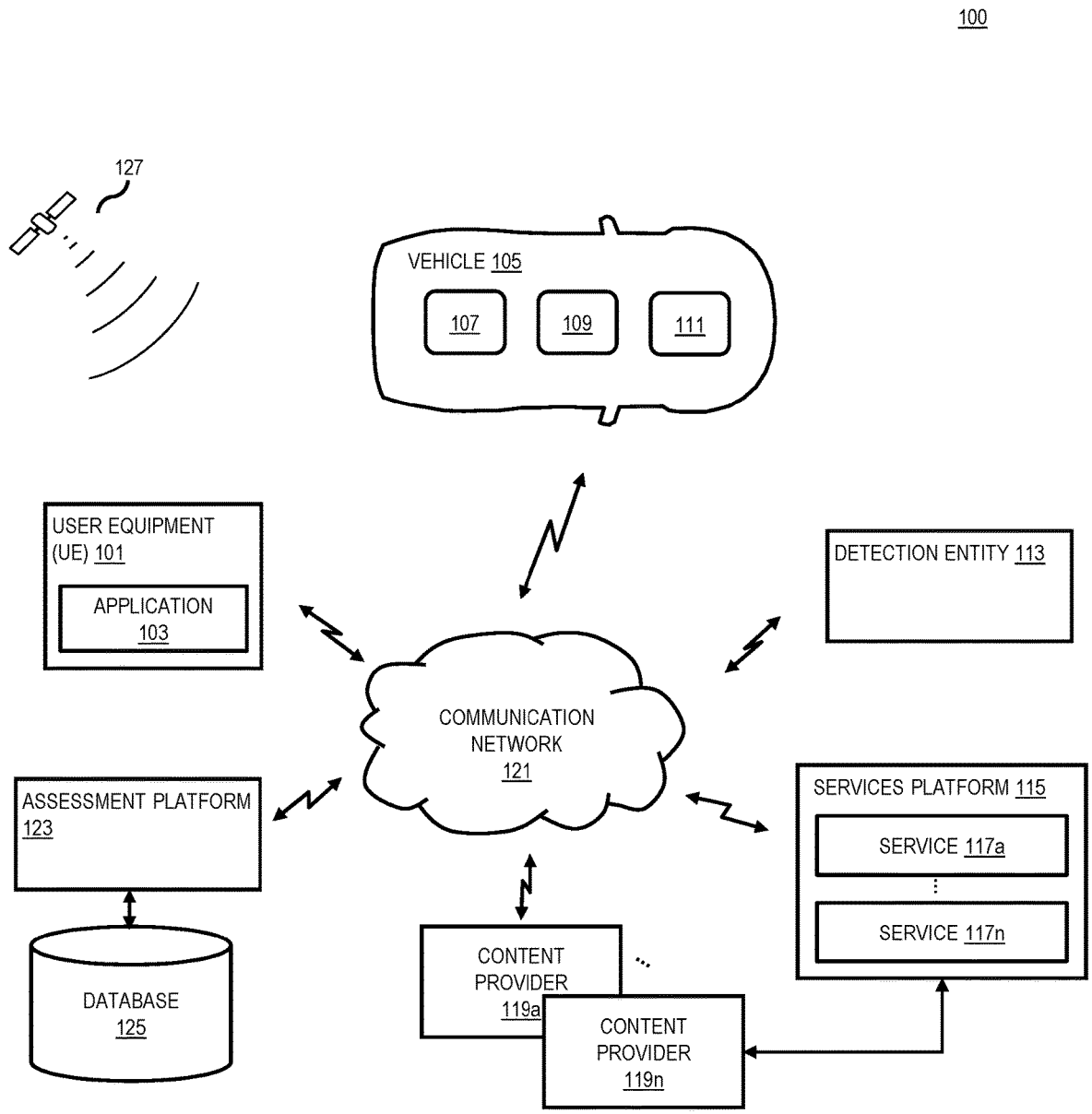
FIG. 1 illustrates a diagram of a system capable of providing a map layer of noise levels.

FIG. 1 is a diagram of a system 100 capable of providing a map layer of noise levels, according to one embodiment. A noise level indicates a decibel level determined by a sound recording sensor. The system includes a user equipment (UE) 101, a vehicle 105, a detection entity 113, a services platform 115, content providers 119a-119n, a communication network 121, a prediction platform 123, a database 125, and a satellite 127. Additional or a plurality of mentioned components may be provided.

In the illustrated embodiment, the system 100 comprises a user equipment (UE) 101 that may include or be associated with an application 103. In one embodiment, the UE 101 has connectivity to the prediction platform 123 via the communication network 121. The prediction platform 123 performs one or more functions associated with providing a map layer of noise levels. In the illustrated embodiment, the UE 101 may be any type of mobile terminal or fixed terminal such as a mobile handset, station, unit, device, multimedia computer, multimedia tablet, Internet node, communicator, desktop computer, laptop computer, notebook computer, netbook computer, tablet computer, personal communication system (PCS) device, personal digital assistants (PDAs), audio/video player, digital camera/camcorder, positioning device, fitness device, television receiver, radio broadcast receiver, electronic book device, game device, devices associated with or integrated with a vehicle (e.g., as part of an infotainment system of the vehicle), or any combination thereof, including the accessories and peripherals of these devices. In one embodiment, the UE 101 can be an in-vehicle navigation system, a personal navigation device (PND), a portable navigation device, a cellular telephone, a mobile phone, a personal digital assistant (PDA), a watch, a camera, a computer, and/or other device that can perform navigation-related functions, such as digital routing and map display. In one embodiment, the UE 101 can be a cellular telephone. A user may use the UE 101 for navigation functions, for example, road link map updates. It should be appreciated that the UE 101 can support any type of interface to the user (such as "wearable" devices, etc.).

In the illustrated embodiment, the application 103 may be any type of application that is executable by the UE 101, such as a mapping application, a location-based service application, a navigation application, a content provisioning service, a camera/imaging application, a media player application, a social networking application, a calendar application, or any combination thereof. In one embodiment, one of the applications 103 at the UE 101 may act as a client for the prediction platform 123 and perform one or more functions associated with the functions of the prediction platform 123 by interacting with the prediction platform 123 over the communication network 121. In one embodiment, the application 103 may provide a map layer of noise levels and provide navigational instructions based on the map layer.

The vehicle 105 may be a standard gasoline powered vehicle, a hybrid vehicle, an electric vehicle, a fuel cell vehicle, and/or any other mobility implement type of vehicle. The vehicle 105 includes parts related to mobility, such as a powertrain with an engine, a transmission, a suspension, a driveshaft, and/or wheels, etc. The vehicle 105 may be a non-autonomous vehicle or an autonomous vehicle. The term autonomous vehicle may refer to a self-driving or driverless mode in which no passengers are required to be on board to operate the vehicle. An autonomous vehicle may be referred to as a robot vehicle or an automated vehicle. The autonomous vehicle may include passengers, but no driver is necessary. These autonomous vehicles may park themselves or move cargo between locations without a human operator. Autonomous vehicles may include multiple modes and transition between the modes. The autonomous vehicle may steer, brake, or accelerate the vehicle based on the position of the vehicle in order, and may respond to lane marking indicators (lane marking type, lane marking intensity, lane marking color, lane marking offset, lane marking width, or other characteristics) and driving commands or navigation commands. In one embodiment, the vehicle 105 may be assigned with an autonomous level. An autonomous level of a vehicle can be a Level 0 autonomous level that corresponds to a negligible automation for the vehicle, a Level 1 autonomous level that corresponds to a certain degree of driver assistance for the vehicle 105, a Level 2 autonomous level that corresponds to partial automation for the vehicle, a Level 3 autonomous level that corresponds to conditional automation for the vehicle, a Level 4 autonomous level that corresponds to high automation for the vehicle, a Level 5 autonomous level that corresponds to full automation for the vehicle, and/or another sub-level associated with a degree of autonomous driving for the vehicle.

In one embodiment, the UE 101 may be integrated in the vehicle 105, which may include assisted driving vehicles such as autonomous vehicles, highly assisted driving (HAD), and advanced driving assistance systems (ADAS). Any of these assisted driving systems may be incorporated into the UE 101. Alternatively, an assisted driving device may be included in the vehicle 105. The assisted driving device may include memory, a processor, and systems to communicate with the UE 101. In one embodiment, the vehicle 105 may be an HAD vehicle or an ADAS vehicle. An HAD vehicle may refer to a vehicle that does not completely replace the human operator. Instead, in a highly assisted driving mode, a vehicle may perform some driving functions and the human operator may perform some driving functions. Such vehicle may also be driven in a manual mode in which the human operator exercises a degree of control over the movement of the vehicle. The vehicle 105 may also include a completely driverless mode. The HAD vehicle may control the vehicle through steering or braking in response to the on the position of the vehicle and may respond to lane marking indicators (lane marking type, lane marking intensity, lane marking color, lane marking offset, lane marking width, or other characteristics) and driving commands or navigation commands. Similarly, ADAS vehicles include one or more partially automated systems in which the vehicle alerts the driver. The features are designed to avoid collisions automatically. Features may include adaptive cruise control, automate braking, or steering adjustments to keep the driver in the correct lane. ADAS vehicles may issue warnings for the driver based on the position of the vehicle or based on the lane marking indicators (lane marking type, lane marking intensity, lane marking color, lane marking offset, lane marking width, or other characteristics) and driving commands or navigation commands.

In one embodiment, the vehicle 105 includes sensors 107, an on-board communication platform 109, and an on-board computing platform 111. The sensors 107 may include image sensors (e.g., electronic imaging devices of both analog and digital types, which include digital cameras, camera modules, camera phones, thermal imaging devices, radar, sonar, lidar, etc.), a network detection sensor for detecting wireless signals or receivers for different short-range communications (e.g., Bluetooth, Wi-Fi, Li-Fi, near field communication (NFC), etc.), temporal information sensors, an audio recorder for gathering audio data, velocity sensors, light sensors, oriental sensors augmented with height sensor and acceleration sensor, traction sensor, suspension sensor, tilt sensors to detect the degree of incline or decline of the vehicle 105 along a path of travel, etc. In a further embodiment, one or more of the sensors 107 about the perimeter of the vehicle 105 may detect the relative distance of the vehicle 105 from stationary objects (e.g., construct, wall, etc.), road objects, lanes, or roadways, the presence of other vehicles, pedestrians, traffic lights, road features (e.g., curves) and any other objects, or a combination thereof. Said sensors 107 may also detect orientations of such objects. In one embodiment, the vehicle 105 may include GPS receivers to obtain geographic coordinates from satellites 127 for determining current location and time associated with the vehicle 105. Further, the location can be determined by a triangulation system such as A-GPS, Cell of Origin, or other location extrapolation technologies.

The on-board communications platform 109 includes wired or wireless network interfaces to enable communication with external networks. The on-board communications platform 109 also includes hardware (e.g., processors, memory, storage, antenna, etc.) and software to control the wired or wireless network interfaces. In the illustrated example, the on-board communications platform 109 includes one or more communication controllers (not illustrated) for standards-based networks (e.g., Global System for Mobile Communications (GSM), Universal Mobile Telecommunications System (UMTS), Long Term Evolution (LTE) networks, 5G networks, Code Division Multiple Access (CDMA), WiMAX (IEEE 802.16m); Near Field Communication (NFC); local area wireless network (including IEEE 802.11 a/b/g/n/ac or others), dedicated short range communication (DSRC), and Wireless Gigabit (IEEE 802.11ad), etc.). In some examples, the on-board communications platform 109 includes a wired or wireless interface (e.g., an auxiliary port, a Universal Serial Bus (USB) port, a Bluetooth® wireless node, etc.) to communicatively couple with the UE 101.

The on-board computing platform 111 performs one or more functions associated with the vehicle 105. In one embodiment, the on-board computing platform 109 may aggregate sensor data generated by at least one of the sensors 107 and transmit the sensor data via the on-board communications platform 109. The on-board computing platform 109 may receive control signals for performing one or more of the functions from the prediction platform 123, the UE 101, the services platform 115, one or more of the content providers 119a-119n, or a combination thereof via the on-board communication platform 111. The on-board computing platform 111 includes at least one processor or controller and memory (not illustrated). The processor or controller may be any suitable processing device or set of processing devices such as, but not limited to: a microprocessor, a microcontroller-based platform, a suitable integrated circuit, one or more field programmable gate arrays (FPGAs), and/or one or more application-specific integrated circuits (ASICs). The memory may be volatile memory (e.g., RAM, which can include non-volatile RAM, magnetic RAM, ferroelectric RAM, and any other suitable forms); non-volatile memory (e.g., disk memory, FLASH memory, EPROMs, EEPROMs, non-volatile solid-state memory, etc.), unalterable memory (e.g., EPROMs), read-only memory, and/or high-capacity storage devices (e.g., hard drives, solid state drives, etc). In some examples, the memory includes multiple kinds of memory, particularly volatile memory and non-volatile memory.

The detection entity 113 may be another vehicle, a drone, a user equipment, or a roadside sensor. The detection entity 113 includes one or more image sensors such as electronic imaging devices of both analog and digital types, which include digital cameras, camera modules, camera phones, thermal imaging devices, radar, sonar, lidar, etc. The detection entity 113 may further include a network detection sensor for detecting wireless signals or receivers for different short-range communications (e.g., Bluetooth, Wi-Fi, Li-Fi, near field communication (NFC), etc.), temporal information sensors, an audio recorder for gathering audio data, velocity sensors, light sensors, oriental sensors augmented with height sensor and acceleration sensor, tilt sensors to detect the degree of incline or decline of the detection entity 113 along a path of travel, etc. In a further embodiment, sensors about the perimeter of the detection entity 113 may detect the relative distance of the detection entity 113 from road objects, lanes, or roadways, the presence of other vehicles, pedestrians, traffic lights, road features (e.g., curves) and any other objects, or a combination thereof. Said sensors may also detect orientations of such objects. In one embodiment, the detection entity 113 may include GPS receivers to obtain geographic coordinates from satellites 127 for determining current location and time associated with the detection entity 113. Further, the location can be determined by a triangulation system such as A-GPS, Cell of Origin, or other location extrapolation technologies. The detection entity 113 may further include a receiver and a transmitter for maintaining communication with the prediction platform 123 and/or other components within the system 100.

The services platform 115 may provide one or more services 117a-117n (collectively referred to as services 117), such as mapping services, navigation services, travel planning services, weather-based services, emergency-based services, notification services, social networking services, content (e.g., audio, video, images, etc.) provisioning services, application services, storage services, contextual information determination services, location-based services, information-based services, etc. In one embodiment, the services platform 115 may be an original equipment manufacturer (OEM) platform. In one embodiment the one or more service 117 may be sensor data collection services. By way of example, vehicle sensor data provided by the sensors 107 may be transferred to the UE 101, the prediction platform 123, the database 125, or other entities communicatively coupled to the communication network 121 through the service platform 115. In one embodiment, the services platform 115 uses the output data generated by of the prediction platform 123 to provide services such as navigation, mapping, other location-based services, etc.

In one embodiment, the content providers 119a-119n (collectively referred to as content providers 119) may provide content or data (e.g., including geographic data, parametric representations of mapped features, etc.) to the UE 101, the vehicle 105, services platform 115, the vehicle 105, the database 125, the prediction platform 123, or the combination thereof. In one embodiment, the content provided may be any type of content, such as map content, textual content, audio content, video content, image content, etc. In one embodiment, the content providers 119 may provide content that may aid in providing a map layer of noise levels, and/or other related characteristics. In one embodiment, the content providers 119 may also store content associated with the UE 101, the vehicle 105, services platform 115, the prediction platform 123, the database 125, or the combination thereof. In another embodiment, the content providers 119 may manage access to a central repository of data, and offer a consistent, standard interface to data, such as a repository of the database 125.

The communication network 121 of system 100 includes one or more networks such as a data network, a wireless network, a telephony network, or any combination thereof. The data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, 5G networks, code division multiple access (CDMA), wideband code division multiple access (WCDMA), wireless fidelity (Wi-Fi), wireless LAN (WLAN), Bluetooth®, Internet Protocol (IP) data casting, satellite, mobile ad-hoc network (MANET), and the like, or any combination thereof.

In the illustrated embodiment, the prediction platform 123 may be a platform with multiple interconnected components. The prediction platform 123 may include multiple servers, intelligent networking devices, computing devices, components and corresponding software for providing a map layer of noise levels. It should be appreciated that that the prediction platform 123 may be a separate entity of the system 100, included within the UE 101 (e.g., as part of the applications 103), included within the vehicle 105 (e.g., as part of an application stored in the memory of the on-board computing platform 111), included within the services platform 115 (e.g., as part of an application stored in server memory for the services platform 115), included within the content providers 119 (e.g., as part of an application stored in sever memory for the content providers 119), or a combination thereof.

The prediction platform 123 is capable of using training data to train a machine learning model to predict a decibel level of an area. Specifically, the prediction platform 123 trains the machine learning model such that the model outputs a predicted decibel level of an area without requiring audio data captured by a sound recording sensor within the area. The training data include images and audio data indicating decibel levels of areas in which the images were captured during instances in which the images were captured. The training data may be structured such that each of the images is associated with a decibel level of an area in which said image was captured during an instance in which said image was captured. For example, an image of an intersection may be captured by a camera equipped by a vehicle at 12:30 PM, and audio data may be captured by an external sound recording sensor equipped by the vehicle at 12:30 PM. The images and the audio data may be acquired by detection entities 113, such as vehicles, stationary roadside sensors, etc. The prediction platform 123 uses the images to train the machine learning model by identifying one or more objects within each of the images and associating the one or more identified objects to the decibel level as indicated by the audio data.

It is contemplated that road links with greater dimensions enable a greater number of vehicles and pedestrians to traverse therein. Since an increasing volume of traffic within an area correlates with an increasing decibel level within the area, data indicating volumes of traffic within the areas in which the images and/or the audio data were acquired may be considered as a part of the training data. By way of example, such data may indicate, for each of the areas: (1) one or more dimensions of each road link within said area (e.g., width and length); (2) a number of vehicles within said area during an instance in which one or more images and/or audio data were acquired within said area; (3) a historical traffic congestion level within said area during an instance in which one or more images and/or audio data were acquired within said area; or (4) a combination thereof.

It is further contemplated that a decibel level of an area may be variable based on temporal factors. For example, heavier traffic and higher decibel levels may be observed within a highway during rush hours in comparison to off-peak hours. As such, in one embodiment, the training data may further include data indicating, for each of the areas in which the images and/or the audio data were acquired, an epoch indicating one or more temporal attributes of an instance in which one or more images and/or audio data were acquired within said area (e.g., time, day, weekday, weekend, week, month, year, season, etc.).

It is further contemplated that a decibel level of an area may be variable based on one or more types of POIs within the area. For example, if a road link is proximate to a stadium or a tourist site, a decibel level of the road link may be higher than a decibel level of a road link within a rural area. As such, in one embodiment, the training data may further include data indicating, for each of the areas in which the images and/or the audio data were acquired: (1) one or more types of POIs within said area; (2) a number of said POIs within said area; or (3) a combination thereof.

The machine learning model receives the training data and transforms the training data into machine-readable and generalizable vectors. The machine learning model renders context around the training data such that commonalities can be detected. Once the machine learning model translates the training data into a vector format suitable to be used as a feature vector for machine learning, the prediction platform 123 trains the machine learning model on resulting pairs (i.e., observations as seen in the training data and desired output value). For example, a desired output value may be defined by a predicted decibel level for a given location during a given instance of time, and observations may be defined by aggregating all occurrences of past events in which images and audio data corresponding to the images were recorded on a particular road segment during a particular setting (e.g., all occurrences having the same vector representation). In one embodiment, the machine learning model may incorporate a computer vision regression model.

Once the machine learning model is trained, the machine learning model receives input data including a request for rendering a predicted decibel level of an area and one or more images of the area. The machine learning model outputs the predicted decibel level of the area as a function of the one or more images. In one embodiment, the predicted decibel level output by the machine learning model indicates a decibel level of the area during an instance in which the one or more images were captured. In one embodiment, the input data may further include data indicating: (1) one or more dimensions of each road link within the area; (2) a number of vehicles within the area during the instance; (3) a historical traffic congestion level within the area during the instance; (4) an epoch of the instance; (5) one or more types of POIs within the area; (6) a number of said POIs within the area; or (7) a combination thereof. The input data may be provided by one or more detection entities 113 within the area during the instance, the services platform 115, the content provider 119, the database 125, or a combination thereof.

In one embodiment, a predicted decibel level of an area may be a predicted average decibel level of the area. To determine the predicted average decibel level, the machine learning model may output a plurality of predicted decibel levels of the area as a function of a plurality of image captured within the area. In one embodiment, the plurality of images may be captured at different instances, where the instances are within a predetermined period (e.g., a minute, an hour, a day, etc.). In one embodiment, the plurality of images may be captured at different orientations/positions within the area and/or captured by different sources. Once the plurality of predicted decibel levels of the area is output, the prediction platform 123 uses the plurality of predicted decibel level of the area to generate the predicted average decibel level of the area.

In one embodiment, a predicted decibel level output by the machine learning model may be represented as a datapoint in a map layer. In one embodiment, the datapoint may be displayed as a plurality of zones coinciding within each other, where the innermost zone among the plurality of zones represents an area in which the predicted decibel level can be detected. Other zones that encompass the innermost zones may represent lesser decibel levels that are calculated as a function of the predicted decibel level. Specifically, since a decibel level of a sound wave generated by a source decreases as the sound wave travel away from the source, a plurality of zones representing various decibel levels may be established to resemble such attribute of the sound wave.

Figure 2:
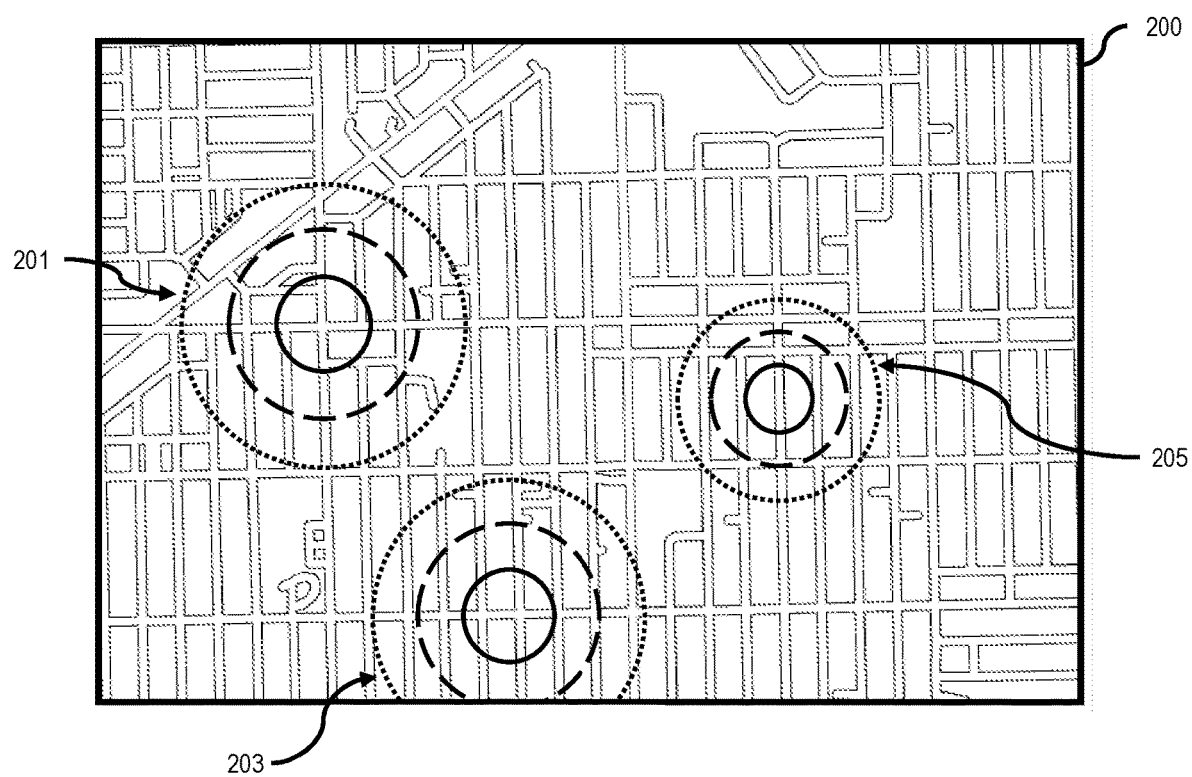
FIG. 2 illustrates an example map layer including datapoints indicating predicted decibel levels.

FIG. 2 illustrates an example map layer including datapoints indicating predicted decibel levels. In the illustrated example, a map layer 200 includes a first datapoint 201 indicating predicted decibel levels of a first area within the map layer 200, a second datapoint 203 indicating predicted decibel levels of a second area within the map layer 200, and a third datapoint 205 indicating predicted decibel levels of a third area within the map layer 200. In the illustrated example, each of the first datapoint 201, the second datapoint 203, and the third datapoint 205 includes a solid-lined circle, a dashed-lined circle, and a dotted-lined circle, where the dashed-line circle encompasses the solid-lined circle, and the dotted-lined circle encompasses the dashed-lined circle and the solid-lined circle. The solid-lined circle defines an area in which a predicted decibel level output by the machine learning model can be detected. The dashed-lined circle defines an area in which a first decibel level can be detected. The first decibel level is less than the predicted decibel level and is calculated as a function of the predicted decibel level. The dotted-lined circle defines an area in which a second decibel level can be detected. The second decibel level is less than the predicted decibel level and the first decibel level and is calculated as a function of the predicted decibel level.

Figure 3:
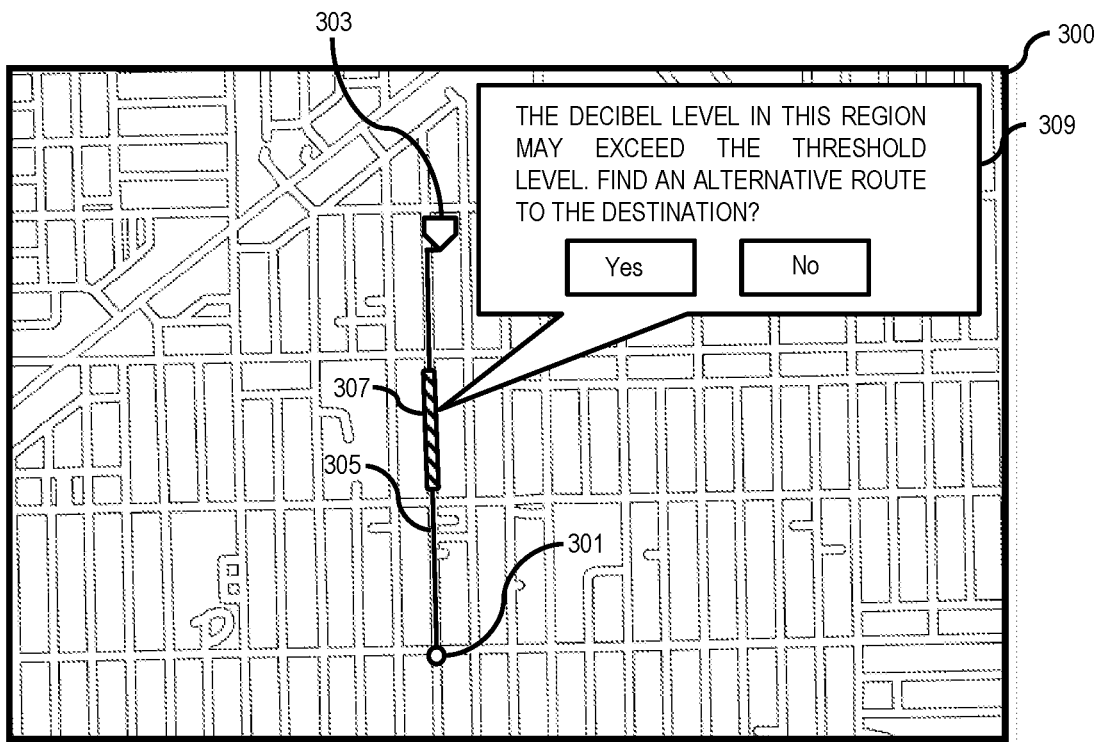
FIG. 3 illustrates an example graphical interface including a route to a destination and a notification indicating a portion of the route that is associated with a decibel level exceeding a threshold level.

In one embodiment, the prediction platform 123 may use the map layer to generate a route for a requesting user. For example, the prediction platform 123 may receive a request for a route to a destination, and the request may indicate that a user wishes to avoid areas having "high" decibel levels. In such example, the prediction platform 123 compares the user's threshold for "high" decibel levels to various datapoints within the map layer and generates the route for the user. In one embodiment, the prediction platform 123 may generate maneuver commands for autonomously maneuvering autonomous vehicles based on the map layer. In such embodiment, the prediction platform 123 may generate the maneuver commands such that the maneuver commands cause the autonomous vehicles to avoid certain areas having "high" decibel levels. In one embodiment, the prediction platform 123 may cause a notification on a user device (e.g., UE 101, a user interface within the vehicle 105, etc.), where the notification indicates the map layer, a route generated based on the map layer, information pertaining to the map layer, or a combination thereof. In one embodiment, the notification may include sound notification, display notification, vibration, or a combination thereof. In one embodiment, the prediction platform 123 may cause the UE 101 and/or a user interface within the vehicle 105 to generate a graphical interface based on a comparison between a predicted decibel level and a threshold decibel level. For example, FIG. 3 illustrates an example graphical interface 300 including a route to a destination and a notification indicating a portion of the route that is associated with a decibel level exceeding a threshold level. In the illustrated example, the graphical interface 300 includes an avatar 301 indicating a current location of a vehicle, a destination 303, a route 305 to the destination 303, and a highlighted portion 307. The prediction platform 123 has determined that, based on a comparison between the route 305 and one or more datapoints within a map layer, the predicted decibel level within the highlighted portion 307 exceeds a threshold decibel level. The threshold decibel level may be a user-selected threshold level or may be a predetermined value. As such, the graphical interface 300 further includes a message prompt 309 stating "THE DECIBEL LEVEL IN THIS REGION MAY EXCEED THE THRESHOLD LEVEL. FIND AN ALTERNATIVE ROUTE TO THE DESTINATION?"

The prediction platform 123 can be implemented in hardware, firmware, software, or a combination thereof. Though depicted as a separate entity in FIG. 1, it is contemplated that the prediction platform 123 may be implemented for direct operation by the UE 101, the vehicle 105, the services platform 115, one or more of the content providers 119, or a combination thereof. As such, the prediction platform 123 may generate direct signal inputs by way of the operating system of the UE 101, the vehicle 105, the services platform 115, the one or more of the content providers 119, or the combination thereof for interacting with the applications 103. The various executions presented herein contemplate any and all arrangements and models.

In the illustrated embodiment, the database 125 stores information on road links (e.g., road length, road breadth, slope information, curvature information, geographic attributes, etc.), probe data for one or more road links (e.g., traffic density information), POIs, and other types map-related features. In one embodiment, the database 125 may include any multiple types of information that can provide means for aiding in providing a map layer of noise levels. It should be appreciated that the information stored in the database 125 may be acquired from any of the elements within the system 100, other vehicles, sensors, database, or a combination thereof.

In one embodiment, the UE 101, the vehicle 105, the detection entity 113, the services platform 115, the content providers 119, the prediction platform 123 communicate with each other and other components of the communication network 121 using well known, new or still developing protocols. In this context, a protocol includes a set of rules defining how the network nodes within the communication network 121 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically affected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 4:
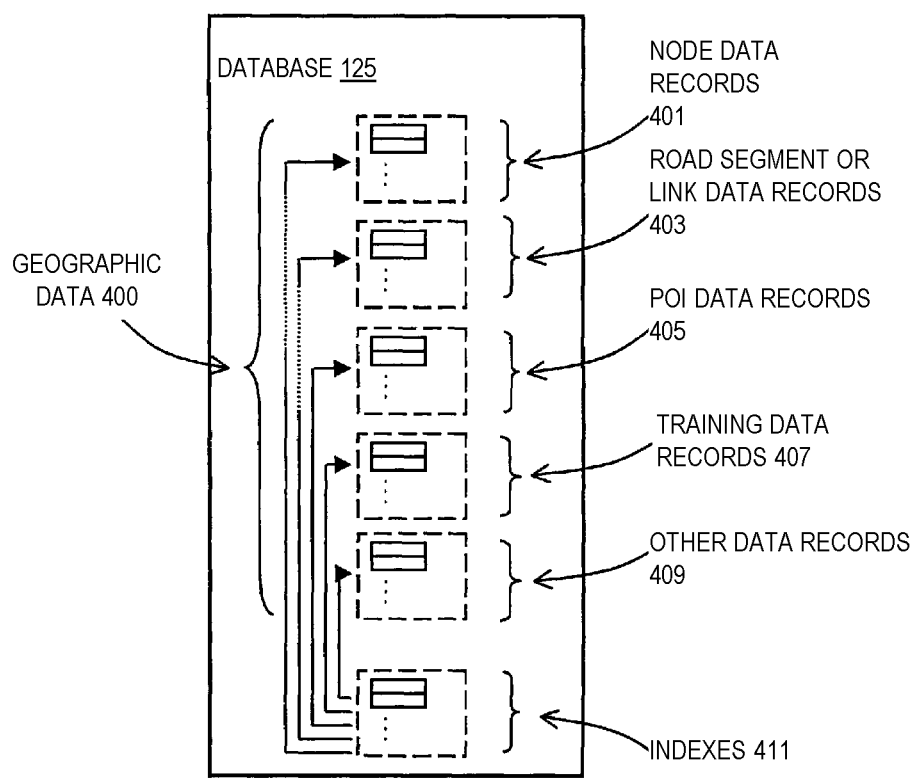
FIG. 4 illustrates a diagram of a database of FIG. 1.

FIG. 4 is a diagram of a database 125 (e.g., a map database), according to one embodiment. In one embodiment, the database 125 includes data 400 used for (or configured to be compiled to be used for) mapping and/or navigation-related services, such as for personalized route determination, according to exemplary embodiments.

In one embodiment, geographic features (e.g., two-dimensional or three-dimensional features) are represented using polygons (e.g., two-dimensional features) or polygon extrusions (e.g., three-dimensional features). For example, the edges of the polygons correspond to the boundaries or edges of the respective geographic feature. In the case of a building, a two-dimensional polygon can be used to represent a footprint of the building, and a three-dimensional polygon extrusion can be used to represent the three-dimensional surfaces of the building. It is contemplated that although various embodiments are discussed with respect to two-dimensional polygons, it is contemplated that the embodiments are also applicable to three-dimensional polygon extrusions, models, routes, etc. Accordingly, the terms polygons and polygon extrusions/models as used herein can be used interchangeably.

In one embodiment, the following terminology applies to the representation of geographic features in the database 125.

"Node"—A point that terminates a link.

"Line segment"—A line connecting two points.

"Link" (or "edge")—A contiguous, non-branching string of one or more line segments terminating in a node at each end.

"Shape point"—A point along a link between two nodes (e.g., used to alter a shape of the link without defining new nodes).

"Oriented link"—A link that has a starting node (referred to as the "reference node") and an ending node (referred to as the "non reference node").

"Simple polygon"—An interior area of an outer boundary formed by a string of oriented links that begins and ends in one node. In one embodiment, a simple polygon does not cross itself.

"Polygon"—An area bounded by an outer boundary and none or at least one interior boundary (e.g., a hole or island). In one embodiment, a polygon is constructed from one outer simple polygon and none or at least one inner simple polygon. A polygon is simple if it just consists of one simple polygon, or complex if it has at least one inner simple polygon.

In one embodiment, the database 125 follows certain conventions. For example, links do not cross themselves and do not cross each other except at a node or vertex. Also, there are no duplicated shape points, nodes, or links. Two links that connect each other have a common node or vertex. In the database 125, overlapping geographic features are represented by overlapping polygons. When polygons overlap, the boundary of one polygon crosses the boundary of the other polygon. In the database 125, the location at which the boundary of one polygon intersects they boundary of another polygon is represented by a node. In one embodiment, a node may be used to represent other locations along the boundary of a polygon than a location at which the boundary of the polygon intersects the boundary of another polygon. In one embodiment, a shape point is not used to represent a point at which the boundary of a polygon intersects the boundary of another polygon.

In one embodiment, the database 125 is presented according to a hierarchical or multi-level tile projection. More specifically, in one embodiment, the database 125 may be defined according to a normalized Mercator projection. Other projections may be used. In one embodiment, a map tile grid of a Mercator or similar projection can a multilevel grid. Each cell or tile in a level of the map tile grid is divisible into the same number of tiles of that same level of grid. In other words, the initial level of the map tile grid (e.g., a level at the lowest zoom level) is divisible into four cells or rectangles. Each of those cells are in turn divisible into four cells, and so on until the highest zoom level of the projection is reached.

In one embodiment, the map tile grid may be numbered in a systematic fashion to define a tile identifier (tile ID). For example, the top left tile may be numbered 00, the top right tile may be numbered 01, the bottom left tile may be numbered 10, and the bottom right tile may be numbered 11. In one embodiment, each cell is divided into four rectangles and numbered by concatenating the parent tile ID and the new tile position. A variety of numbering schemes also is possible. Any number of levels with increasingly smaller geographic areas may represent the map tile grid. Any level (n) of the map tile grid has 2(n+1) cells. Accordingly, any tile of the level (n) has a geographic area of A/2(n+1) where A is the total geographic area of the world or the total area of the map tile grids. Because of the numbering system, the exact position of any tile in any level of the map tile grid or projection may be uniquely determined from the tile ID.

As shown, the database 125 includes node data records 401, road segment or link data records 403, POI data records 405, training data records 407, other records 409, and indexes 411, for example. More, fewer or different data records can be provided. In one embodiment, additional data records (not shown) can include cartographic ("carto") data records, routing data, and maneuver data. In one embodiment, the indexes 411 may improve the speed of data retrieval operations in the database 125. In one embodiment, the indexes 411 may be used to quickly locate data without having to search every row in the database 125 every time it is accessed.

In exemplary embodiments, the road segment or link data records 403 are links or segments representing roads, streets, or paths, as can be used in the calculated route or recorded route information for determination of one or more personalized routes. The node data records 401 are end points (such as intersections) corresponding to the respective links or segments of the road segment data records 403. The road segment or link data records 403 and the node data records 401 represent a road network, such as used by vehicles, cars, and/or other entities. Alternatively, the database 125 can contain path segment and node data records or other data that represent pedestrian paths or areas in addition to or instead of the vehicle road record data, for example. In one embodiment, the road or path segments can include an altitude component to extend to paths or road into three-dimensional space (e.g., to cover changes in altitude and contours of different map features, and/or to cover paths traversing a three-dimensional airspace).

Links, segments, and nodes can be associated with attributes, such as geographic coordinates, road surface type, road surface condition, functional class, curvature, degree of traffic, number and types of accidents that have occurred, a number of road objects (e.g., road markings, road signs, traffic light posts, etc.), types of road objects, traffic directions, street names, address ranges, speed limits, turn restrictions at intersections, presence of roadworks, and other navigation related attributes, as well as POIs, such as gasoline stations, hotels, restaurants, museums, stadiums, offices, automobile dealerships, auto repair shops, factories, buildings, stores, parks, etc. The database 125 can include data about the POIs and their respective locations in the POI data records 405. The database 125 can also include data about places, such as cities, towns, or other communities, and other geographic features, such as bodies of water, mountain ranges, etc. Such place or feature data can be part of the POI data records 405 or can be associated with POIs or POI data records 405 (such as a datapoint used for displaying or representing a position of a city).

The training data records 407 include images and audio data indicating decibel levels of areas in which the images were captured during instances in which the images were captured. The training data records 407 may further include data indicating, for each of the areas: (1) one or more dimensions of each road link within said area; (2) a number of vehicles within said area during an instance in which one or more images and/or audio data were acquired within said area; (3) a historical traffic congestion level within said area during an instance in which one or more images and/or audio data were acquired within said area; (4) an epoch indicating one or more temporal attributes of an instance in which one or more images and/or audio data were acquired within said area; (5) one or more types of POIs within said area; (6) a number of said POIs within said area; or (7) a combination thereof.

Other data records 409 may embody algorithms defining a machine learning model trained to predict a decibel level within an area and a map layer indicating noise levels within various areas.

In one embodiment, the database 125 can be maintained by the services platform 115 and/or one or more of the content providers 119 in association with a map developer. The map developer can collect geographic data to generate and enhance the database 125. There can be different ways used by the map developer to collect data. These ways can include obtaining data from other sources, such as municipalities or respective geographic authorities. In addition, the map developer can employ field personnel to travel by vehicle along roads throughout the geographic region to observe attributes associated with one or more road segments and/or record information about them, for example. Also, remote sensing, such as aerial or satellite photography, can be used.

The database 125 can be a master database stored in a format that facilitates updating, maintenance, and development. For example, the master database or data in the master database can be in an Oracle spatial format or other spatial format (e.g., accommodating different map layers), such as for development or production purposes. The Oracle spatial format or development/production database can be compiled into a delivery format, such as a geographic data files (GDF) format. The data in the production and/or delivery formats can be compiled or further compiled to form database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by the vehicle 105, for example. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received database in a delivery format to produce one or more compiled navigation databases.

The processes described herein for providing a map layer of noise levels may be advantageously implemented via software, hardware (e.g., general processor, Digital Signal Processing (DSP) chip, an Application Specific Integrated Circuit (ASIC), Field Programmable Gate Arrays (FPGAs), etc.), firmware, or a combination thereof.

Figure 5:
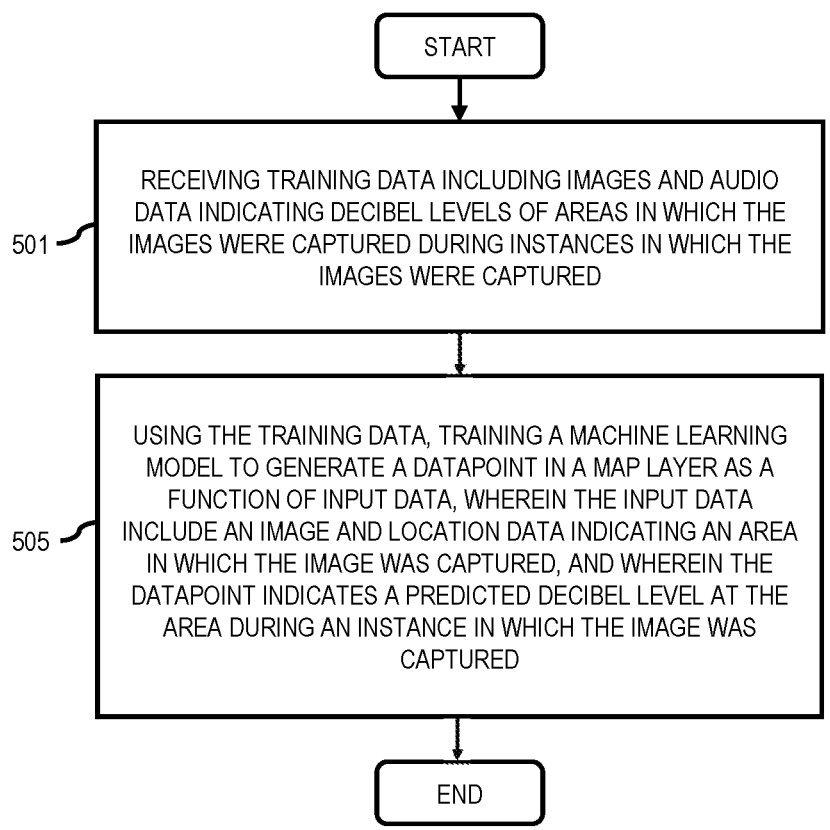
FIG. 5 illustrates a flowchart of a process for training a machine learning model to provide a map layer of noise levels.
Figure 8:
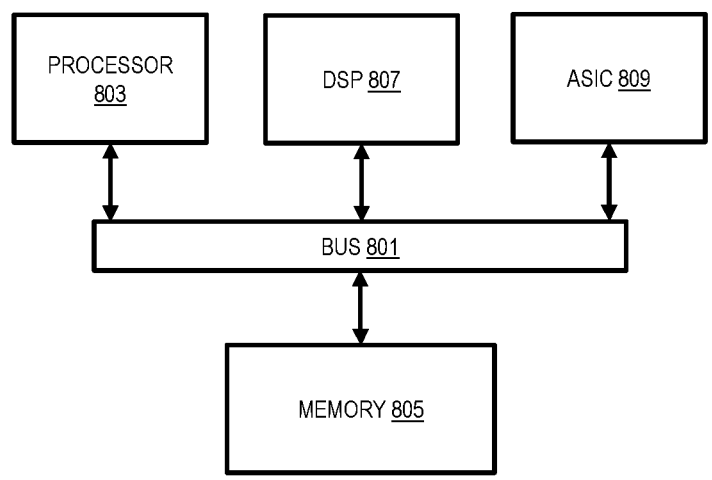
FIG. 8 illustrates a chip set or chip upon which an embodiment may be implemented.

FIG. 5 is a flowchart of a process 500 for training a machine learning model to provide a map layer of noise levels, according to one embodiment. In one embodiment, the prediction platform 123 performs the process 500 and is implemented in, for instance, a chip set including a processor and a memory as shown in FIG. 8.

At step 501, the prediction platform 123 receives training data including images and audio data indicating decibel levels of areas in which the images were captured during instances in which the images were captured. The images and audio data may be acquired by vehicles and/or stationary roadside sensors equipped image and sound recording sensors.

At step 503, the prediction platform 123 uses the training data to train a machine learning model to generate a datapoint in a map layer as a function of input data. The input data include an image and location data indicating an area in which the image was captured. The datapoint indicate a predicted decibel level at the area during an instance in which the image was captured. The input data may be acquired by vehicles and/or stationary roadside sensors equipped image and sound recording sensors.

Figure 6:
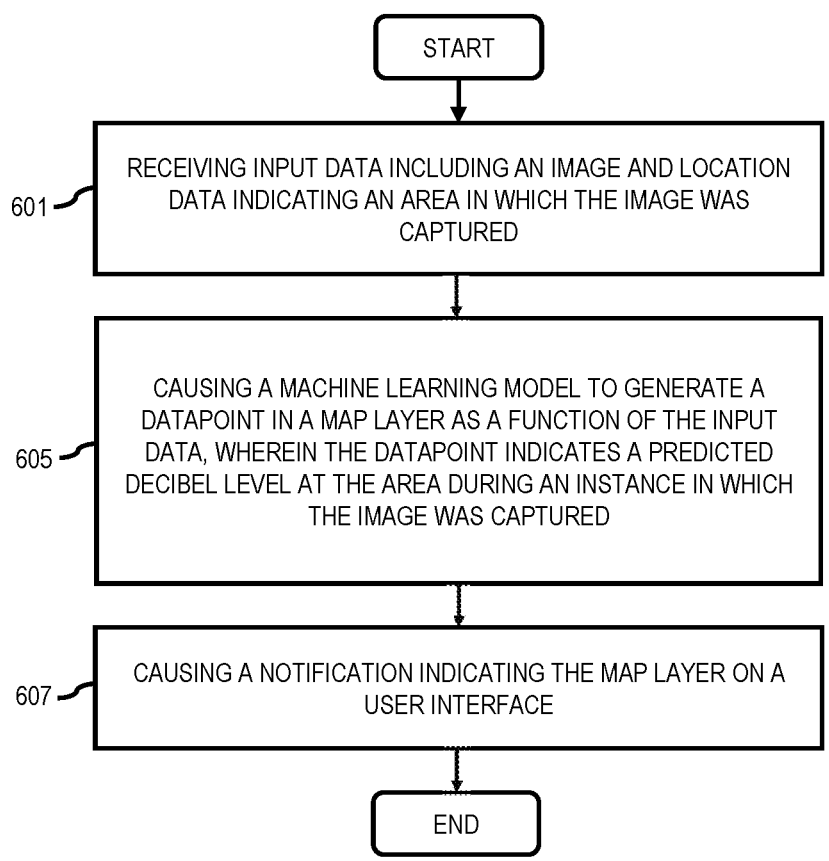
FIG. 6 illustrates a flowchart of a process for providing a map layer of noise levels.

FIG. 6 is a flowchart of a process 500 for providing a map layer of noise levels, according to one embodiment. In one embodiment, the prediction platform 123 performs the process 500 and is implemented in, for instance, a chip set including a processor and a memory as shown in FIG. 8.

At step 601, the prediction platform 123 receives input data including an image and location data indicating an area in which the image was captured. The input data may be acquired by vehicles and/or stationary roadside sensors equipped image and sound recording sensors.

At step 603, the prediction platform 123 causes a machine learning model to generate a datapoint in the map layer as a function of the input data. The datapoint indicates a predicted decibel level at the location during an instance in which the target image was captured. The machine learning model is trained to generate the datapoint as a function of the input data based on training data. The training data include images and audio data indicating decibel levels of instances in which the images were captured.

At step 605, the prediction platform 123 causes a notification indicating the map layer on a user interface. The notification may include sound notification, display notification, vibration, or a combination thereof. In one embodiment, the notification may further indicate a route generated based on the map layer, information pertaining to the map layer, or a combination thereof.

The system, apparatus, and methods described herein reliably predicts noise levels of areas without necessitating collection of audio data within said areas. As such, an amount of relevant data available within a map layer of noise levels can be increased and reliability of a map layer of noise levels can be improved. Additionally, the map layer is particularly useful for users wishing to avoid areas having "high" decibel levels, thereby improving the quality of travel for both pedestrians and drivers. Furthermore, audio-based navigation systems can readily utilize the map layer to improve audio-based navigations. For example, the audio-based navigation systems utilize sound signature generating infrastructures to provide audio cues, which function as navigational instructions for vehicles equipped with sound recording sensors. The audio-based navigation systems can use the map layer to identify areas that have "low" decibel levels and include the sound signature generating infrastructures and generate a route that overlap with one or more of said areas. As such, the route is less susceptible to noise that may degrade the quality of sound signatures output by sound signature generating infrastructures and improve the audio-based navigation systems. Further, the map layer can be used to strategically install sound signature generating infrastructures, thereby improving the utility of the audio-based navigation systems.

The processes described herein may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 7:
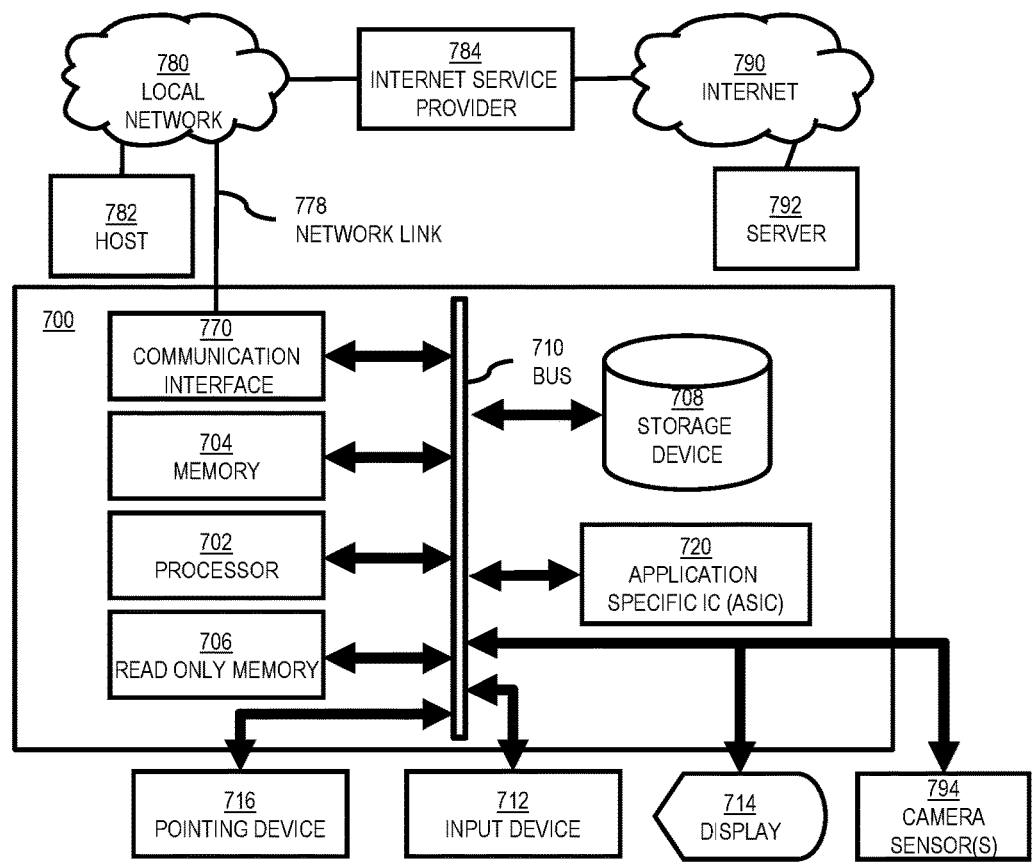
FIG. 7 illustrates a computer system upon which an embodiment may be implemented.

FIG. 7 illustrates a computer system 700 upon which an embodiment of the invention may be implemented. Although computer system 700 is depicted with respect to a particular device or equipment, it is contemplated that other devices or equipment (e.g., network elements, servers, etc.) within FIG. 7 can deploy the illustrated hardware and components of system 700. Computer system 700 is programmed (e.g., via computer program code or instructions) to provide a map layer of noise levels as described herein and includes a communication mechanism such as a bus 710 for passing information between other internal and external components of the computer system 700. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 700, or a portion thereof, constitutes a means for performing one or more steps of providing a map layer of noise levels.

A bus 710 includes one or more parallel conductors of information so that information is transferred quickly among devices coupled to the bus 710. One or more processors 702 for processing information is coupled with the bus 710.

A processor (or multiple processors) 702 performs a set of operations on information as specified by computer program code related to providing a map layer of noise levels. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 710 and placing information on the bus 710. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 702, such as a sequence of operation codes, constitute processor instructions, also called computer system instructions or, simply, computer instructions. Processors may be implemented as mechanical, electrical, magnetic, optical, chemical, or quantum components, among others, alone or in combination.

Computer system 700 also includes a memory 704 coupled to bus 710. The memory 704, such as a random access memory (RAM) or any other dynamic storage device, stores information including processor instructions for providing a map layer of noise levels. Dynamic memory allows information stored therein to be changed by the computer system 700. RAM allows a unit of information stored at a location called a memory address to be stored and retrieved independently of information at neighboring addresses. The memory 704 is also used by the processor 702 to store temporary values during execution of processor instructions. The computer system 700 also includes a read only memory (ROM) 706 or any other static storage device coupled to the bus 710 for storing static information, including instructions, that is not changed by the computer system 700. Some memory is composed of volatile storage that loses the information stored thereon when power is lost. Also coupled to bus 710 is a non-volatile (persistent) storage device 708, such as a magnetic disk, optical disk or flash card, for storing information, including instructions, that persists even when the computer system 700 is turned off or otherwise loses power.

Information, including instructions for providing a map layer of noise levels, is provided to the bus 710 for use by the processor from an external input device 712, such as a keyboard containing alphanumeric keys operated by a human user, a microphone, an Infrared (IR) remote control, a joystick, a game pad, a stylus pen, a touch screen, or a sensor. A sensor detects conditions in its vicinity and transforms those detections into physical expression compatible with the measurable phenomenon used to represent information in computer system 700. Other external devices coupled to bus 710, used primarily for interacting with humans, include a display device 714, such as a cathode ray tube (CRT), a liquid crystal display (LCD), a light emitting diode (LED) display, an organic LED (OLED) display, a plasma screen, or a printer for presenting text or images, and a pointing device 716, such as a mouse, a trackball, cursor direction keys, or a motion sensor, for controlling a position of a small cursor image presented on the display 714 and issuing commands associated with graphical elements presented on the display 714, and one or more camera sensors 794 for capturing, recording and causing to store one or more still and/or moving images (e.g., videos, movies, etc.) which also may comprise audio recordings. In some embodiments, for example, in embodiments in which the computer system 700 performs all functions automatically without human input, one or more of external input device 712, display device 714 and pointing device 716 may be omitted.

In the illustrated embodiment, special purpose hardware, such as an application specific integrated circuit (ASIC) 720, is coupled to bus 710. The special purpose hardware is configured to perform operations not performed by processor 702 quickly enough for special purposes. Examples of ASICs include graphics accelerator cards for generating images for display 714, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 700 also includes one or more instances of a communications interface 770 coupled to bus 710. Communication interface 770 provides a one-way or two-way communication coupling to a variety of external devices that operate with their own processors, such as printers, scanners and external disks. In general the coupling is with a network link 778 that is connected to a local network 780 to which a variety of external devices with their own processors are connected. For example, communication interface 770 may be a parallel port or a serial port or a universal serial bus (USB) port on a personal computer. In some embodiments, communications interface 770 is an integrated services digital network (ISDN) card or a digital subscriber line (DSL) card or a telephone modem that provides an information communication connection to a corresponding type of telephone line. In some embodiments, a communication interface 770 is a cable modem that converts signals on bus 710 into signals for a communication connection over a coaxial cable or into optical signals for a communication connection over a fiber optic cable. As another example, communications interface 770 may be a local area network (LAN) card to provide a data communication connection to a compatible LAN, such as Ethernet. Wireless links may also be implemented. For wireless links, the communications interface 770 sends or receives or both sends and receives electrical, acoustic or electromagnetic signals, including infrared and optical signals, that carry information streams, such as digital data. For example, in wireless handheld devices, such as mobile telephones like cell phones, the communications interface 770 includes a radio band electromagnetic transmitter and receiver called a radio transceiver. In certain embodiments, the communications interface 770 enables connection to the communication network 121 for providing a map layer of noise levels to the UE 101.

The term "computer-readable medium" as used herein refers to any medium that participates in providing information to processor 702, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 708. Volatile media include, for example, dynamic memory 704. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 720.

Network link 778 typically provides information communication using transmission media through one or more networks to other devices that use or process the information. For example, network link 778 may provide a connection through local network 780 to a host computer 782 or to equipment 784 operated by an Internet Service Provider (ISP). ISP equipment 784 in turn provides data communication services through the public, world-wide packet-switching communication network of networks now commonly referred to as the Internet 790.

A computer called a server host 782 connected to the Internet hosts a process that provides a service in response to information received over the Internet. For example, server host 782 hosts a process that provides information representing video data for presentation at display 714. It is contemplated that the components of system 700 can be deployed in various configurations within other computer systems, e.g., host 782 and server 792.

At least some embodiments of the invention are related to the use of computer system 700 for implementing some or all of the techniques described herein. According to one embodiment of the invention, those techniques are performed by computer system 700 in response to processor 702 executing one or more sequences of one or more processor instructions contained in memory 704. Such instructions, also called computer instructions, software and program code, may be read into memory 704 from another computer-readable medium such as storage device 708 or network link 778. Execution of the sequences of instructions contained in memory 704 causes processor 702 to perform one or more of the method steps described herein. In alternative embodiments, hardware, such as ASIC 720, may be used in place of or in combination with software to implement the invention. Thus, embodiments of the invention are not limited to any specific combination of hardware and software, unless otherwise explicitly stated herein.

The signals transmitted over network link 778 and other networks through communications interface 770, carry information to and from computer system 700. Computer system 700 can send and receive information, including program code, through the networks 780, 790 among others, through network link 778 and communications interface 770. In an example using the Internet 790, a server host 782 transmits program code for a particular application, requested by a message sent from computer 700, through Internet 790, ISP equipment 784, local network 780 and communications interface 770. The received code may be executed by processor 702 as it is received, or may be stored in memory 704 or in storage device 708 or any other non-volatile storage for later execution, or both. In this manner, computer system 700 may obtain application program code in the form of signals on a carrier wave.

Various forms of computer readable media may be involved in carrying one or more sequence of instructions or data or both to processor 702 for execution. For example, instructions and data may initially be carried on a magnetic disk of a remote computer such as host 782. The remote computer loads the instructions and data into its dynamic memory and sends the instructions and data over a telephone line using a modem. A modem local to the computer system 700 receives the instructions and data on a telephone line and uses an infra-red transmitter to convert the instructions and data to a signal on an infra-red carrier wave serving as the network link 778. An infrared detector serving as communications interface 770 receives the instructions and data carried in the infrared signal and places information representing the instructions and data onto bus 710. Bus 710 carries the information to memory 704 from which processor 702 retrieves and executes the instructions using some of the data sent with the instructions. The instructions and data received in memory 704 may optionally be stored on storage device 708, either before or after execution by the processor 702.

FIG. 8 illustrates a chip set or chip 800 upon which an embodiment of the invention may be implemented. Chip set 800 is programmed to provide a map layer of noise levels as described herein and includes, for instance, the processor and memory components described with respect to FIG. 7 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 800 can be implemented in a single chip. It is further contemplated that in certain embodiments the chip set or chip 800 can be implemented as a single "system on a chip." It is further contemplated that in certain embodiments a separate ASIC would not be used, for example, and that all relevant functions as disclosed herein would be performed by a processor or processors. Chip set or chip 800, or a portion thereof, constitutes a means for performing one or more steps of providing user interface navigation information associated with the availability of functions. Chip set or chip 800, or a portion thereof, constitutes a means for performing one or more steps of providing a map layer of noise levels.

In one embodiment, the chip set or chip 800 includes a communication mechanism such as a bus 801 for passing information among the components of the chip set 800. A processor 803 has connectivity to the bus 801 to execute instructions and process information stored in, for example, a memory 805. The processor 803 may include one or more processing cores with each core configured to perform independently. A multi-core processor enables multiprocessing within a single physical package. Examples of a multi-core processor include two, four, eight, or greater numbers of processing cores. Alternatively or in addition, the processor 803 may include one or more microprocessors configured in tandem via the bus 801 to enable independent execution of instructions, pipelining, and multithreading. The processor 803 may also be accompanied with one or more specialized components to perform certain processing functions and tasks such as one or more digital signal processors (DSP) 807, or one or more application-specific integrated circuits (ASIC) 809. A DSP 807 typically is configured to process real-world signals (e.g., sound) in real-time independently of the processor 803. Similarly, an ASIC 809 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one embodiment, the chip set or chip 800 includes merely one or more processors and some software and/or firmware supporting and/or relating to and/or for the one or more processors. The processor 803 and accompanying components have connectivity to the memory 805 via the bus 801. The memory 805 includes both dynamic memory (e.g., RAM, magnetic disk, writable optical disk, etc.) and static memory (e.g., ROM, CD-ROM, etc.) for storing executable instructions that when executed perform the inventive steps described herein to provide a map layer of noise levels. The memory 805 also stores the data associated with or generated by the execution of the inventive steps.

Figure 9:
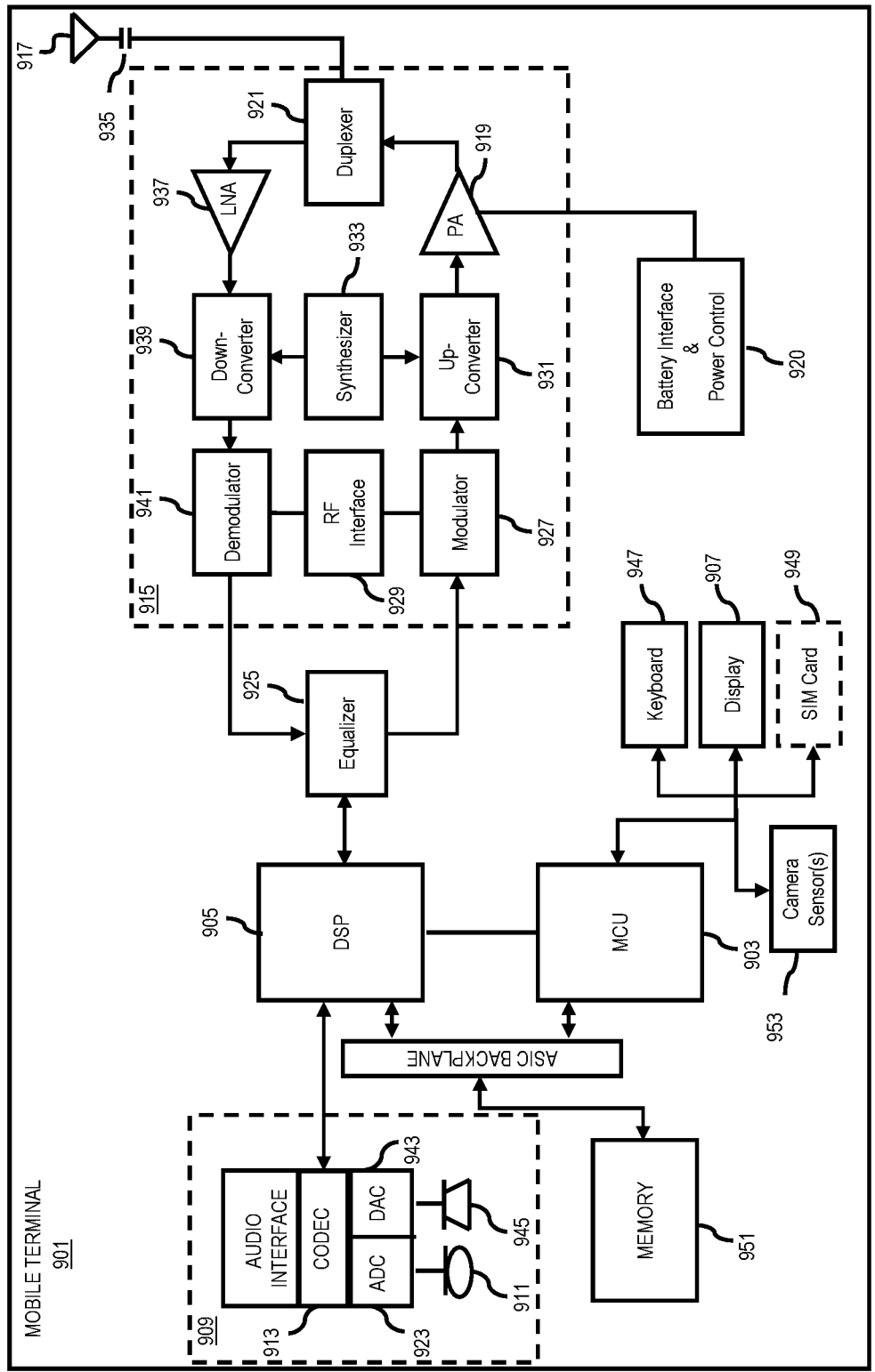
FIG. 9 illustrates a diagram of exemplary components of a mobile terminal for communications, which is capable of operating in the system of FIG. 1.

FIG. 9 is a diagram of exemplary components of a mobile terminal 901 (e.g., a mobile device or vehicle or part thereof) for communications, which is capable of operating in the system of FIG. 1, according to one embodiment. In some embodiments, mobile terminal 901, or a portion thereof, constitutes a means for performing one or more steps of providing a map layer of noise levels. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a base-band integrated circuit or applications processor integrated circuit in a mobile phone or a similar integrated circuit in a cellular network device or other network devices.

Pertinent internal components of the telephone include a Main Control Unit (MCU) 903, a Digital Signal Processor (DSP) 905, and a receiver/transmitter unit including a microphone gain control unit and a speaker gain control unit. A main display unit 907 provides a display to the user in support of various applications and mobile terminal functions that perform or support the steps of providing a map layer of noise levels. The display 907 includes display circuitry configured to display at least a portion of a user interface of the mobile terminal (e.g., mobile telephone). Additionally, the display 907 and display circuitry are configured to facilitate user control of at least some functions of the mobile terminal. An audio function circuitry 909 includes a microphone 911 and microphone amplifier that amplifies the speech signal output from the microphone 911. The amplified speech signal output from the microphone 911 is fed to a coder/decoder (CODEC) 913.

A radio section 915 amplifies power and converts frequency in order to communicate with a base station, which is included in a mobile communication system, via antenna 917. The power amplifier (PA) 919 and the transmitter/modulation circuitry are operationally responsive to the MCU 903, with an output from the PA 919 coupled to the duplexer 921 or circulator or antenna switch, as known in the art. The PA 919 also couples to a battery interface and power control unit 920.

In use, a user of mobile terminal 901 speaks into the microphone 911 and his or her voice along with any detected background noise is converted into an analog voltage. The analog voltage is then converted into a digital signal through the Analog to Digital Converter (ADC) 923. The control unit 903 routes the digital signal into the DSP 905 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 925 for compensation of any frequency-dependent impairments that occur during transmission though the air such as phase and amplitude distortion. After equalizing the bit stream, the modulator 927 combines the signal with a RF signal generated in the RF interface 929. The modulator 927 generates a sine wave by way of frequency or phase modulation. In order to prepare the signal for transmission, an up-converter 931 combines the sine wave output from the modulator 927 with another sine wave generated by a synthesizer 933 to achieve the desired frequency of transmission. The signal is then sent through a PA 919 to increase the signal to an appropriate power level. In practical systems, the PA 919 acts as a variable gain amplifier whose gain is controlled by the DSP 905 from information received from a network base station. The signal is then filtered within the duplexer 921 and optionally sent to an antenna coupler 935 to match impedances to provide maximum power transfer. Finally, the signal is transmitted via antenna 917 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 901 are received via antenna 917 and immediately amplified by a low noise amplifier (LNA) 937. A down-converter 939 lowers the carrier frequency while the demodulator 941 strips away the RF leaving only a digital bit stream. The signal then goes through the equalizer 925 and is processed by the DSP 905. A Digital to Analog Converter (DAC) 943 converts the signal and the resulting output is transmitted to the user through the speaker 945, all under control of a Main Control Unit (MCU) 903 which can be implemented as a Central Processing Unit (CPU).

The MCU 903 receives various signals including input signals from the keyboard 947. The keyboard 947 and/or the MCU 903 in combination with other user input components (e.g., the microphone 911) comprise a user interface circuitry for managing user input. The MCU 903 runs a user interface software to facilitate user control of at least some functions of the mobile terminal 901 to provide a map layer of noise levels. The MCU 903 also delivers a display command and a switch command to the display 907 and to the speech output switching controller, respectively. Further, the MCU 903 exchanges information with the DSP 905 and can access an optionally incorporated SIM card 949 and a memory 951. In addition, the MCU 903 executes various control functions required of the terminal. The DSP 905 may, depending upon the implementation, perform any of a variety of conventional digital processing functions on the voice signals. Additionally, DSP 905 determines the background noise level of the local environment from the signals detected by microphone 911 and sets the gain of microphone 911 to a level selected to compensate for the natural tendency of the user of the mobile terminal 901.

The CODEC 913 includes the ADC 923 and DAC 943. The memory 951 stores various data including call incoming tone data and is capable of storing other data including music data received via, e.g., the global Internet. The software module could reside in RAM memory, flash memory, registers, or any other form of writable storage medium known in the art. The memory device 951 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 949 carries, for instance, important information, such as the cellular phone number, the carrier supplying service, subscription details, and security information. The SIM card 949 serves primarily to identify the mobile terminal 901 on a radio network. The card 949 also contains a memory for storing a personal telephone number registry, text messages, and user specific mobile terminal settings.

Further, one or more camera sensors 953 may be incorporated onto the mobile station 901 wherein the one or more camera sensors may be placed at one or more locations on the mobile station. Generally, the camera sensors may be utilized to capture, record, and cause to store one or more still and/or moving images (e.g., videos, movies, etc.) which also may comprise audio recordings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

I claim:

1. A non-transitory computer-readable storage medium having computer program code instructions stored therein, the computer program code instructions, when executed by at least one processor, cause the at least one processor to:
   receive input data including an target image and location data indicating an area in which the target image was captured;
   cause a machine learning model to generate a datapoint in a map layer as a function of the input data, wherein the datapoint indicates a predicted decibel level at the area during an instance in which the target image was captured, wherein the machine learning model is trained to generate the datapoint as a function of the input data based on training data, and wherein the training data include images and audio data indicating decibel levels of areas in which the images were captured during instances in which the images were captured;
   cause the machine learning model to generate the datapoint by identifying one or more objects within the target image and associating the one or more objects identified in the target image to the predicted decibel level;
   compare the predicted decibel level to a threshold decibel level;
   based on the area and the comparison of the predicted decibel level to the threshold decibel level, generate a route and vehicle maneuver commands for traversing the route; and
   execute the vehicle maneuver commands to cause a vehicle to traverse at least a portion of the route.

2. The non-transitory computer-readable storage medium of claim 1, wherein the computer program code instructions, when executed by the at least one processor, cause the at least one processor to cause a notification indicating the map layer on a user interface.

3. The non-transitory computer-readable storage medium of claim 1, wherein the training data further indicate widths of road links within the areas, and wherein the input data indicate a width of one or more road links within the area.

4. The non-transitory computer-readable storage medium of claim 1, wherein the training data further indicate a number of vehicles within the areas during the instances, and wherein the input data indicate a number of vehicles within the area during the instance.

5. The non-transitory computer-readable storage medium of claim 1, wherein the training data further indicate historical traffic congestion levels within the areas during the instances, and wherein the input data indicate a historical traffic congestion level within the area during the instance.

6. The non-transitory computer-readable storage medium of claim 1, wherein the training data further indicate types of points-of-interests (POIs) within the areas, and wherein the input data indicate one or more types of POIs within the area.

7. A method of providing a map layer of noise levels, the method comprising:
- receiving input data including a target image and location data indicating an area in which the target image was captured;
- causing a machine learning model to generate a datapoint in the map layer as a function of the input data, wherein the datapoint indicates a predicted decibel level at the area during an instance in which the target image was captured, wherein the machine learning model is trained to generate the datapoint as a function of the input data based on training data, and wherein the training data include images and audio data indicating decibel levels of instances areas in which the images were captured during instances in which the images were captured;
- causing the machine learning model to generate the datapoint by identifying one or more objects within the target image and associating the one or more objects identified in the target image to the predicted decibel level;
- comparing the predicted decibel level to a threshold decibel level;
- based on the area and the comparison of the predicted decibel level to the threshold decibel level, generating a route and vehicle maneuver commands for traversing the route; and
- executing the vehicle maneuver commands by the at least one processor to cause a vehicle to traverse at least a portion of the route.

8. The method of claim 7, wherein the training data further indicate widths of road links within the areas, and wherein the input data indicate a width of one or more road links within the area.

9. The method of claim 7, wherein the training data further indicate a number of vehicles within the areas during the instances, and wherein the input data indicate a number of vehicles within the area during the instance.

10. The method of claim 7, wherein the training data further indicate historical traffic congestion levels within the areas during the instances, and wherein the input data indicate a historical traffic congestion level within the area during the instance.

11. The method of claim 7, wherein the training data further indicate types of points-of-interests (POIs) within the areas, and wherein the input data indicate one or more types of POIs within the area.

12. An apparatus comprising at least one processor and at least one non-transitory memory including computer program code instructions, the computer program code instructions configured to, when executed, cause the apparatus to:
- receive input data including a target image and location data indicating an area in which the target image was captured;
- cause a machine learning model to generate a datapoint in the map layer as a function of the input data, wherein the datapoint indicates a predicted decibel level at the location during an instance in which the target image was captured, wherein the machine learning model is trained to generate the datapoint as a function of the input data based on training data, and wherein the training data include images and audio data indicating decibel levels of instances areas in which the images were captured during instances in which the images were captured;
- cause the machine learning model to generate the datapoint by identifying one or more objects within the target image and associating the one or more objects identified in the target image to the predicted decibel level;
- compare the predicted decibel level to a threshold decibel level;
- based on the area and the comparison of the predicted decibel level to the threshold decibel level, generate a route and vehicle maneuver commands for traversing the route; and
- execute the vehicle maneuver commands by the at least one processor to cause a vehicle to traverse at least a portion of the route.

13. The apparatus of claim 12, wherein the training data further indicate widths of road links within the areas, and wherein the input data indicate a width of one or more road links within the area.

14. The apparatus of claim 12, wherein the training data further indicate a number of vehicles within the areas during the instances, and wherein the input data indicate a number of vehicles within the area during the instance.

15. The apparatus of claim 12, wherein the training data further indicate historical traffic congestion levels within the areas during the instances, and wherein the input data indicate a historical traffic congestion level within the area during the instance.

\* \* \* \* \*